US008048605B2

(12) United States Patent
Khan et al.

(10) Patent No.: US 8,048,605 B2
(45) Date of Patent: Nov. 1, 2011

(54) LASER-MARKABLE COMPOSITIONS

(75) Inventors: Nazir Khan, Nottingham (GB); Martin Robert Walker, Nottingham (GB)

(73) Assignee: Datalase Ltd, Cheshire (GB)

( * ) Notice: Subject to any disclaimer, the term of this patent is extended or adjusted under 35 U.S.C. 154(b) by 748 days.

(21) Appl. No.: 10/899,888

(22) Filed: Jul. 26, 2004

(65) Prior Publication Data

US 2005/0032957 A1    Feb. 10, 2005

Related U.S. Application Data

(63) Continuation-in-part of application No. 10/380,381, filed as application No. PCT/GB02/01250 on Mar. 18, 2002.

(30) Foreign Application Priority Data

| Mar. 16, 2001 | (GB) | ................................ | 0106603.4 |
| Apr. 3, 2001 | (GB) | ................................ | 0108360.9 |
| Jul. 30, 2003 | (GB) | ................................ | 0317829.0 |
| Nov. 12, 2003 | (GB) | ................................ | 0326392.8 |

(51) Int. Cl.
  *G03F 7/00*    (2006.01)
(52) U.S. Cl. .................... 430/270.1; 430/292.2; 524/406
(58) Field of Classification Search ............... 430/270.1, 430/292.2
  See application file for complete search history.

(56) References Cited

U.S. PATENT DOCUMENTS

| 4,762,700 | A | 8/1988 | Huggins |
| 4,835,133 | A | 5/1989 | Yanagihara et al. |
| 4,861,620 | A | 8/1989 | Azuma et al. |
| 4,879,338 | A | 11/1989 | Mercer et al. |
| 5,063,137 | A | 11/1991 | Kiyonari et al. |
| 5,413,629 | A | 5/1995 | Yasui et al. |
| 5,578,120 | A | 11/1996 | Takahashi et al. |
| 5,608,429 | A | 3/1997 | Hayashihara et al. |
| 5,626,966 | A | 5/1997 | Kulper et al. |
| 5,691,757 | A | 11/1997 | Hayashihara et al. |
| 5,883,176 | A | 3/1999 | Gerroir et al. |
| 5,948,323 | A | 9/1999 | McLaughlin et al. |
| 5,981,155 | A * | 11/1999 | Vercruysse et al. ........... 430/507 |
| 6,344,244 | B1 | 2/2002 | Schrof et al. |
| 6,351,063 | B1 | 2/2002 | Lee et al. |
| 6,695,028 | B1 | 2/2004 | Scheuber et al. |
| 7,485,403 | B2 * | 2/2009 | Khan ........................ 430/270.1 |
| 2005/0231585 | A1 * | 10/2005 | Mudigonda et al. .......... 347/238 |

FOREIGN PATENT DOCUMENTS

| DE | 38 34 526 A | 4/1990 |
| EP | 0 105 451 A2 | 3/1984 |
| EP | 0 407 947 A | 1/1991 |
| EP | 0389113 A2 | 2/1991 |
| EP | 0 447 032 A | 9/1991 |
| EP | 0 766 546 B1 | 9/1997 |
| EP | 0 878 317 | 11/1998 |
| EP | 0 993 964 | 4/2000 |
| EP | 1 357 226 A | 10/2003 |
| GB | 2 201 377 | 9/1988 |
| JP | 63-153187 | 6/1988 |
| JP | 63 209889 A | 12/1988 |
| JP | 05 057463 | 3/1993 |
| JP | 07 052536 | 8/1993 |
| JP | 09-255762 | 9/1997 |
| JP | 09 263668 A | 10/1997 |
| JP | 11029711 A * | 2/1999 |
| JP | 11-321093 | 11/1999 |
| JP | 2001-26727 | 1/2001 |
| WO | WO 94/12352 A1 | 6/1994 |
| WO | WO 01/00419 | 1/2001 |
| WO | WO 01/23189 A1 | 4/2001 |
| WO | WO 02074548 A2 * | 9/2002 |

OTHER PUBLICATIONS

Machine-Assisted Translation of JP 11-029711 A, Feb. 2, 1999.*
Full English-language translation of JP 11-029711 A, Feb. 2, 1999.*
Database WPI, Section Ch, Week 1999915, Derwent Publications Ltd., London, GB; AN 1999-175761 & JP 11 029711 A (Nippon Pelnox KK, Feb. 2, 1999).
Database WPI, Section Ch, Week 199325, Derwent Publications Ltd., London, GB, AN 1993 and SU 1 743 896 A (As Belo Gen Inorg Chem Inst, Jun. 30, 1992, abstract).
Database WPI, Section Ch, Week 199208, Derwent Publications Ltd., London, GB, AN 1992-062857 and SU 1 650 477 A (As Belo Gen Inorg C, May 23, 1991, abstract).
Database WPI, Section Ch, Week 198232, Derwent Publications Ltd., London, GB, AN 1982-66592E and JP 57 105393 A (Toppan Printing Co. Ltd., Jun. 30, 1982, abstract).
Kennelly, William et al. (Mar. 13, 2000) In: Molybdates as a Component of Low Smoke, High Performance Plastics (9 pages).
Carbon Dioxide Laser—*Wikipedia, the free encyclopedia*, (last modified on May 21, 2007).
Climax Molybdenum, *A Phelps Dodge Company*, Datasheet "Ammonium Heptamolybdate (AHM)", Mar. 2001, CAS No. 12054-85-2.
Climax Molybdenum, *A Phelps Dodge Company*, Datasheet "Ammonium Octamolybdate (AOM-WA)", Mar. 1999, CAS No. 12411-64-2, EINECS No. 2356506.
"Handbook for Pulp & Paper Technologists", *Textbook*, 1982, pp. 262-273.
Kennelly et al., "Color Stability of Rigid PVC with Molybdates", *Plastic Compounding*, May/Jun. 1990, vol. 13, No. 3, pp. 48-49.
Ma, "The Thermal Decomposition of Ammonium Polymolybdates. II", *Bulletin of the Chemical Society of Japan*, May 1964, vol. 37, No. 5, pp. 648-653.

* cited by examiner

*Primary Examiner* — Vickey Nerangis
(74) *Attorney, Agent, or Firm* — Saliwanchik, Lloyd & Eisenschenk

(57) ABSTRACT

A laser-markable composition which comprises a binder and an oxyanion of a multivalent metal.

11 Claims, No Drawings

LASER-MARKABLE COMPOSITIONS

CROSS-REFERENCE TO A RELATED APPLICATION

This application is a continuation-in-part of co-pending application Ser. No. 10/380,381, filed Mar. 14, 2003; which is a national stage application of International Application Number PCT/GB02/01250, filed Mar. 18, 2002, which claims priority to GB 0106603.4, filed Mar. 16, 2001 and 0108360.9, filed Apr. 3, 2001. This application also claims priority to GB 0317829.0, filed Jul. 30, 2003 and GB 0326392.8, filed Nov. 12, 2003.

FIELD OF THE INVENTION

This invention relates to a composition that can be extruded or formulated as a lacquer and is also capable of being printed by use of a laser.

BACKGROUND OF THE INVENTION

Various proposals have been made, in order to achieve effective printing on a substrate, by causing a change of colour in the substrate on which the printing is to appear. Various pigments have been proposed, which can be used to mark a substrate on the application of laser energy. Some of these proposals may be found in, for example, WO-A-00/43456, JP-A-11001065, EP-A-0522370, EP-A-0797511, U.S. Pat. No. 5,053,440, U.S. Pat. No. 5,350,792 (a plastics moulding composition comprising a polyoxymethylene and animal charcoal), U.S. Pat. No. 5,928,780, U.S. Pat. No. 6,017,972 and U.S. Pat. No. 6,019,831. U.S. Pat. No. 5,489,639 and U.S. Pat. No. 5,884,079 disclose that copper hydroxy phosphate is a laser-markable material.

Ammonium octamolybdate, having the formula $(NH_4)_4Mo_8O_{26}$ and abbreviated herein as AOM, is a readily available material that has fire-retardant properties. For this purpose, it has been formulated with polymers such as polyvinyl chloride (PVC). For example, PVC-containing cables may contain AOM as a smoke-suppressing agent. AOM is an example of an oxyanion of a multivalent metal; many compounds of this type exist in coloured lower valence or non-stoichiometric states.

Printing on packaging such as cartonboard is of considerable commercial importance. This may be simply to provide visible information to a person handling the packages, but is also required for bar-coding and other marking that is intended to be read by machine. This entails two particular problems.

Firstly, the most economical packaging material tends to be brown or some other indeterminate colour, against which bar-coding in, say, black has low contrast (typically grade C or D). Secondly, because of the need to customise packaging, there is wastage involved in printing information on packaging that has to be adapted for each particular customer.

SUMMARY OF THE INVENTION

It has been found that many oxyanions in combination with polymer binders absorb at the wavelength of $CO_2$ laser light (10,600 nm) and undergo a colour change due to a change in oxidation state, but are not affected by ultraviolet light (commonly used for polymer curing) or by the temperatures, typically around 200-300° C., used in extrusion. AOM behaves in this way. It is thus effectively laser-selective, and provides a very suitable material for use in inks intended for application to surfaces which may be required to undergo a heat treatment or for incorporation into polymer extrusions, and be marked by the application of laser light.

According to one aspect of the present invention, an ink composition comprises:
   a solvent;
   a binder, preferably but not essentially having a labile group; and
   an oxyanion of a multivalent metal.

According to a further aspect of the invention, a polymer laminate or extrudate incorporates a laser-markable material such as an oxyanion of a multivalent metal. This is useful for producing tamper-proof labels.

According to yet another aspect of the present invention, a method for providing an image on a substrate comprises applying, to a relatively small area of the substrate, a formulation comprising a pigment and a component that forms an image on irradiation with laser light, wherein the image has greater contrast with respect to the pigment than with respect to the substrate. As in other aspects of the invention, the component may be an oxyanion of a multivalent metal.

This method allows high contrast to be achieved (typically grade A or B) between the image and its immediate background. Further, the fact that the image can be provided on demand, and is not dependent on the supply of the substrate, means that the wastage inherent in customisation can be avoided; this can lead to substantial savings in cost, for packaging produced in high volume.

Yet other aspects of the invention, as described in more detail below, are the use of IR absorbers in laser-markable compositions, and particular materials that have been found to have utility as IR absorbers.

DESCRIPTION OF PREFERRED EMBODIMENTS

In an oxyanion-containing compound for use in the invention, the cation may be ammonium or an alkali or alkaline earth metal, but is not critical. The oxyanion may be a molybdate, tungstate or analogous transition metal compound. Such compounds include di- and hepta-molybdates. The compound is preferably AOM; the following description refers to AOM for the purposes of illustration only. Currently, AOM is preferred because it is readily available, and is selective for a robust, low-power $CO_2$ laser operating at about 10,600 nm.

An ink formulation to be used in the invention may be water-based, solvent-based, or UV-curable, and it may be a solution or dispersion. The formulation may include a chargeable component, for use in an ink jet printer.

The binder and the AOM are intimately mixed with the solvent which may be selected from those usually used for inks and lacquers, e.g. water, ethanol, ethyl acetate, isopropyl alcohol, hydrocarbons, etc. The components may be present in solution and/or dispersion. The amount of the AOM in the ink is typically 1 to 90% by weight. The binder is typically polymeric, and may be selected from commercially-available polymers including acrylics, celluloses, PVOH, polyesters, etc. The binder preferably includes a labile group such as hydroxyl, acetoxy, ether acetal or halogen and this has the function of undergoing elimination reaction, to give a colour-forming entity (see also WO-A-02/068205 and U.S. patent application Ser. No. 10/344,393, the contents of which are incorporated herein by reference).

AOM can be incorporated into various polymer systems and milled, using a bead mill, to a desired particle size, without any technical difficulty. Examples of polymer systems in which AOM has been successfully incorporated and milled include nitrocellulose solution in alcohol/ethyl acetate, cellulose acetate propionate solution in alcohol/ethyl acetate, polyvinyl butyral solution in alcohol/ethyl acetate, solvent-based polyurethane resin, solvent-based epoxide resin, solvent-based polyester resin, water-based acrylic resin, water-based polyester resin, water-based polyurethane resin, solventless ultra violet light curable monomers and oligomers, solvent-based polyamides, solvent-based polyimides, water-based polyamides, water-based polyimides, solvent-based epoxy/vinyl/polyester coatings and lacquers, and siloxane resins.

Organic and inorganic pigments can be incorporated into AOM inks/coatings without any adverse effect on the laser markability of the AOM inks/coatings. Further, the AOM inks/coatings containing the organic and inorganic pigments can be milled to desired particle size without difficulty or adverse affect on the laser markability of AOM inks/coatings.

The AOM component may alternatively be melt-incorporated into extrudable polymers, or it may be incorporated into UV-cure monomer formulations. A film or laminate of layers which include a laser-markable component provides a tamper-proof product. Extrudable polymers which can be used in the invention include nylon, polyesters, polyamide, polycarbonate, polyacrylate, polymethacrylate, ABS graft polymers, polyolefins such as polyethylene or polypropylene, polystyrene, polyvinyl chloride, polyoxymethylene, polyimide, polyethers and polyether ketones, thermoplastic elastomers, thermoplastic polyurethane which may be used individually or as a blend of various polymers, are suitable as the polymer matrix. The amount of AOM that is incorporated is typically 0.1 to 5% by weight of the extrudate.

The AOM or analogue thereof may be laser-selective, by which is meant that it absorbs energy at a wavelength, e.g. of ~1064 nm or ~10600 nm, for which a laser can be chosen accordingly, such that it undergoes a colour change. The colour change will typically be the result of a change in valence state and/or the formation of non-stoichiometric products, although there may also be some reaction with the binder. The laser that is used can operate in either the dot matrix mode or continuous-wave, scribing mode.

The substrate may be board, e.g. cartonboard. Packaging that may be used in the invention may alternatively be in the form of a polymeric film, such as polypropylene or polyethylene, and which may be laminated and used, for example, for wrapping chocolate. If a multi-layer packaging material is used, the invention is applicable at whatever layer the ink is present.

Any pigment that is used in the invention may be conventional. A white pigment may be preferred, providing not only contrast with, say, black bar-coding but also opacity. Other colours may be chosen, as desired. Typical pigments include $CaCO_3$, $ZnO$, $TiO_2$ and talc.

A formulation of the invention may also include conventional components that are present in order to provide the image. Typically, they include a material that absorbs incident laser light; this material may itself change colour on absorption, or may react with another material to provide a change of colour. Typical reactants include phenols, phenolic resins, carboxylic acids together with a colour-former, e.g. Crystal Violet Lactone. Typical absorbing agents include clays, micas, $TiO_2$, carbonates, oxides, talc, silicates and aluminosilicates.

It will be appreciated by one of ordinary skill in the art that it is possible to incorporate additives of various sorts in the imaging layers, and which might be beneficial in certain circumstances. Such additives include, for example, polymer binders, mild reducing agents to promote thermal printer performance, colorants such as dyes or pigments, antioxidants and other known stabilisers, antiblocking materials such as talc or selected silicas, and materials adsorbent to or reactive with any thermolysis products of laser imaging.

An additive of particular utility, in solution or suspension or in a separate layer, is an electron-donating dye precursor often known as a colour-former. When amine molybdates are incorporated in a layer with such colour-formers and thermally imaged, e.g. using a $CO_2$ laser, coloured images may be obtained. The colour may correspond to that obtained by the use of common colour developers such as certain phenols. Weak block images may also be obtained, e.g. using a heat sealer at 100-120 C. and contact times of 1-10 seconds. Thus the amine molybdate acts as an electron acceptor and colour developer for at least some of these colour-formers. The low melting point of amine molybdates means that they can be fused with colour-formers, if desired.

Protective polymer or other layers on the imaging layer may be useful in some circumstances. For example, such layers may prevent or reduce mechanical or chemical damage to the unexposed or exposed thermally sensitive layers of the invention. Layers comprising mild reducing agents may also be added to promote thermal printer performance. Such layers may also act to reduce emanation of any thermolysis products of laser imaging. Such layers can be applied by known means such as lamination or coating.

As indicated above, an image can be formed by the application of heat. Preferably, heat is applied locally, on irradiation with a laser. Suitable lasers include those emitting at high energy, including Nd-YAG lasers and $CO_2$ lasers, the latter typically at a wavelength of 10,600 nm. In many cases, it may be desirable to use a low-energy laser, such as a diode laser, typically emitting light at a wavelength in the range of 800-1500 nm. In certain circumstances, this energy input may be insufficient to cause the desired reaction, and the composition to be irradiated then preferably comprises a suitable absorbent material.

Further additives that may be used are thus IR-absorbent materials, many of which are known. In general terms, any suitable such material may be incorporated, for the purposes of this invention, and can be chosen by one of ordinary skill in the art. A particularly preferred IR absorber for use in the invention or any related technology is a conducting polymer, by which is meant a material that, in the polymerised state, comprises linked monomers (typically rings) that are conjugated and which can therefore allow delocalisation/conduction of positive or negative charge. The conjugation allows an absorption shift that can be controlled such that it applies to the wavelength of irradiation, and which may also depend on the concentration of the polymer.

Examples of monomers that can be conjugated to give suitable conducting polymers are aniline, thiophene, pyrrole, furan and substituted derivatives thereof. Such polymers, in addition to providing the desired means of transferring heat from a low-power laser, have the advantage that they do not readily diffuse out of the coating material. They can also act as the polymer binder. Yet another advantage of such materials is that they can be colourless, even at high loading (up to 5% by weight); this is by contrast to monomeric species that have been used, such as phthalocyanine, which absorb at about 800 nm but give the composition a greenish tinge, even at a loading of 0.1% by weight.

Depending on the components to be irradiated, a black or coloured image may be obtained. The colour may be dependent on the irradiation power; thus, for example, a blue colour may be overpowered to black.

Multi-colour printing may also be achieved, e.g. using different colour-formers (and, if necessary, absorbers) responsive to different irradiation wavelengths. For example, UV, diode and $CO_2$ lasers may be used to give three-colour printing, by providing appropriate, different colour formers at different/overlapping locations on the substrate.

The initial colour of coating and image achieved on activation is not limited. Theoretically, any initial or final colour (red, blue, green, etc) is achievable and the energy required to develop the image (e.g. 100-140° C./2-4 Watts) can be controlled within a range. Additionally, a step-change of the image colour produced can be controlled with activation (e.g. 150-200° C./3-5 Watts), and so more than one distinct colour is possible from the same coating.

In general, the pigment can be one or more of a range of water-compatible materials as an ammonium octamolybdate.

The binder can be one or more of a range of water-soluble or amine-stabilised emulsion polymers, for a water-borne dispersion ink, or a solvent-soluble polymer for a solvent-borne dispersion or solution ink. Acrylic polymers can be used in each case.

Pigments can be water-dispersible inorganic or organic additives such as calcium carbonate etc.

One or more of a range of additives can be utilised, including surfactants or lubricants such as zinc stearate etc.

The IR-sensitive coating can be applied by a range of methods such as flood coating, flexo/gravure etc.

The IR-sensitive coating can be applied to a range of substrates such as self-adhesive label etc.

A protective layer of a film-forming water-borne top-coat ink can be applied onto the IR-sensitive coating.

The IR-absorber can be one or more of a range of water-compatible organic or inorganic materials, for a water-borne dispersion ink, or a solvent-compatible, organic or inorganic material for a solvent-borne dispersion or solution ink (in the latter case, the material is preferably solvent-soluble).

The following Examples illustrate the invention, but are not intended to be limiting in scope.

Examples 1 to 7

Solvent, water-based and UV-cure inks were formulated with ammonium octamolybdate (AOM). Lacquers were made in the proportions shown, coated onto cartonboard and dried. They were then marked using a scanning $CO_2$ laser with a beam diameter of 0.3 mm and a scan speed of 1000 $mm \cdot s^{-1}$. The amounts used, and results, are shown in Table 1.

Example 8

197 g polypropylene homopolymer was blended with 3 g of a 4:1 mixture of AOM:Iriodin 805, by mixing well on an Optiblender 2000 (Moulinex). The blend was compounded and palletised on a FOS axon extruder 11502 at temperatures of 190° C., 200° C., 210° C., 220° C. and 225° C. in the five respective zones. The moulded polymer could be marked with a $CO_2$ laser.

Examples 9 and 10

The procedure of Example 8 was followed, but using HDPE and HIPS, respectively. The moulded polymers could be satisfactorily marked with Nd-YAG and $CO_2$ lasers, respectively.

Example 11

An opaque white ink was formulated as below:

| | |
|---|---|
| Phenolic resin | 17% |
| Colour Former | 6% |
| Binder | 7% |
| $TiO_2$ | 6% |
| Mica | 2% |
| Water | balance |

This was printed by flexography to produce a panel on manila corrugate. The resulting white panel was exposed to the beam from a scribing $CO_2$ laser to produce a one-dimension bar code. The bar code was good quality, with class A/B verification, when the black colour former Pergascript black I-R or Pergascript black I-2R (Ciba Speciality Chemicals) was used.

Example 12

A semi-opaque ink was formulated as described in Example 1, but without the pigment, and was gravure-printed onto white cartonboard. A scribing $CO_2$ laser was then used to produce alphanumeric and two-dimensional codes in the

TABLE 1

| EXAMPLE | BINDER | QUANTITY (g) | ADDITIVE | QUANTITY (g) | SOLVENT | QUANTITY (g) | LASER MARKING POWER (W) | COLOUR OF IMAGE |
|---|---|---|---|---|---|---|---|---|
| 1 | Polyvinyl alcohol (Gohsenol GH17) | 1.1 | AOM | 1 | Water | 9 | 3 | Black |
| 2 | Alcotex 395B (26%) | 12 | AOM | 2 | Methanol/ methylacetate | — | 3 | Black |
| 3 | Ethyl Cellulose | 2 | AOM | 2 | Ethanol | 15 | 3 | Black |
| 4 | Klucel (hydroxy propyl cellulose) | 2 | AOM | 2 | Water | 15 | 3 | Black |
| 5 | Mowital B30H | 2 | AOM | 2 | Ethanol | 10 | 3 | Black |
| 6 | PVC Vycar 577E | 15 | AOM | 3 | Water | 9 | 3 | Black |
| 7 | Ebecryl 657 Ebecryl 1608 | 3.5 3.5 | AOM | 3 | Irgacure 651 (Photoinitiator) | 0.7 | 3 | Black |

Gohsenol was obtained from CIBA Speciality Chemicals
Alcotex was obtained from Harlow Chemicals
Klucel was obtained from Hercules
Mowital was obtained from Hoechst
Vycar was obtained from B. F. Goodrich
Ebecryl was obtained from UCB Chemicals printed ink. The machine-readable code was of high quality when Pergascript black I-R, Pergascript Black I-2R or Pergascript Blue I-2G was used.

Example 13

An opaque ink was formulated as in Example 11 and patches were printed by flexography onto flexible packaging film (polypropylene). Alphanumeric codes were then written into the patches using both a scribing and a dot-matrix $CO_2$ laser.

Example 14

As in Example 13, patches were printed onto polypropylene film. The printed side of the film was then laminated with another sheet of polymeric material so that the printed patch was encapsulated. A $CO_2$ laser was then used to produce an alphanumeric code within the patch by exposure through the film.

Example 15

| | |
|---|---|
| Polyvinyl chloride | 30% |
| Ammonium octamolybdate | 15% |
| Ethyl alcohol | balance |

The given components were formulated as a lacquer. This was coated down onto aluminium foil, using a Meyer bar, and dried. The semi-opaque coating was then exposed to a $CO_2$ laser beam of 0.3 mm diameter sweeping at $1000\,mm\cdot s^{-1}$ at an output power of 3 W, to produce a black image.

Example 16

An opaque ink was formulated as given in Example 11, using a blue Colour Former but also with the addition of a small amount (0.4% by weight) of red pigment. The ink was printed by flexography onto white cartonboard, and the resulting pink panel was exposed to the $CO_2$ laser beam. The image produced was purple.

Example 17

| | |
|---|---|
| Ammonium heptamolybdate (AHM) | 220 g |
| Nitrocellulose DLX 3-5 | 250 g |
| Ethanol | 800 g |
| Ethyl acetate | 200 g |

To a stirring solution of ethanol/ethyl acetate, nitrocellulose DLX 3-5 was added gradually. After the addition was complete the mixture was allowed stir at room temperature until a clear solution was obtained. Then a very fine powder of ammonium heptamolybdate was added portion-wise and after the addition was complete the mixture was stirred until uniform dispersion was achieved. This was coated down onto carton board, using a doctor blade, and dried. The semi-opaque coating was then exposed to a $CO_2$ laser beam of 0.3 mm diameter at a scan speed of $1000\,mm\cdot s^{-1}$ at an output power of 3-4 W, to produce a black image.

Example 18

| | |
|---|---|
| Texicryl 13-576 | 100 g |
| Ammonium heptamolybdate (AHM) | 20 g |
| Ammonia (25%) | 0.5 g |

To a stirring aqueous emulsion of Texicryl 13-567 (Ciba Specialty Chemicals), a fine powder of ammonium heptamolybdate was added gradually. After addition was complete, the mixture was stirred at room temperature until dissolution of ammonium heptamolybdate was obtained. This was coated down onto carton board, using a doctor blade, and dried. The semi-opaque coating was then exposed to a $CO_2$ laser beam of 0.3 mm diameter at scan speed of $1000\,mm\cdot s^{-1}$ at an output power of 3-4 W, to produce a black image.

Example 19

| | |
|---|---|
| Ammonium Dimolybdate (ADM) | 220 g |
| Nitrocellulose DLX 3-5 | 250 g |
| IMS | 800 g |
| Ethyl acetate | 200 g |

To a stirring solution of IMS (industrial methylated spirit)/ethanol/ethyl acetate, nitrocellulose DLX 3-5 was added gradually. After the addition was complete, the mixture was allowed to stir at room temperature until a clear solution was obtained. Then a very fine powder of ammonium dimolybdate was added portion-wise and, after the addition was complete, the mixture was stirred until a uniform dispersion was achieved. This was coated down onto carton board, using a doctor blade, and dried. The semi-opaque coating was then exposed to a $CO_2$ laser beam of 0.3 mm diameter at scan speed of $1000\,mm\cdot s^{-1}$ at an output power of 3-4 W, to produce a black image.

Example 20

Example 18 was repeated, using ADM instead of AHM and 0.3 g ammonia. Again, a black image was obtained.

Example 21

Example 19 was repeated, using ammonium paratungstate (APW) instead of ADM. Again, a black image was obtained.

Example 22

Example 20 was repeated, using APW instead of ADM. Again, a black image was obtained.

Example 23

Example 19 was repeated, using ammonium metatungstate instead of ADM. Again, a black image was obtained.

Example 24

Example 20 was repeated, using ammonium paratungstate instead of ADM. Again, a black image was obtained.

Example 25

Water-Borne Dispersion Inks

The effect of the presence of an IR absorber in an ink formulation of the invention was determined. Blue and red water-based acrylic-emulsion inks of PVOH-stabilised dispersion (comprising PBI2RN or PRI6B colour former) were assessed.

A "standard" formulation of the invention was used, comprising the following proportions of components (% w/w):

| | |
|---|---|
| Binder | 26.5 |
| Active Pigment | 26.9 |
| Fluid | 46.6 |

Various "active" formulations were used, each containing the IR absorber Baytron P (HC Starck), a conducting polymer. The proportions of IR absorber used were 1.0, 2.5 and 5.0% (w/w). In, for example, formulations comprising 5.0% Baytron P, the composition was:

| | |
|---|---|
| Binder | 25.2 |
| Active Pigment | 25.6 |
| Fluid | 44.2 |
| IR Absorber | 5.0 |

The components were selected from:

| | |
|---|---|
| Binder | Gohsenol GH-17 polyvinyl alcohol and Texicryl acrylic emulsion; |
| Active Pigment | HC Starck AOM; |
| Colour Former | Pergascript blue I-2RN crystal violet lactone and red I-6B; |
| Fluid | water, dilute ammonium hydroxide etc; and |
| IR Absorber | Baytron P |

A 940 nm Rofin Dilas DF060 Diode Laser and K-bar 2.5-coated substrates were used for image forming.

The results are shown in Table 2. A good image was obtained when Baytron P was present.

TABLE 2

| IR Absorber | Level (% w/w) | Unimaged | Imaged (940 nm) |
|---|---|---|---|
| — | n/a | White | No Image |
| — | n/a | " | " |
| Baytron P | 5.0 | Off-white (slight) | Black Image |
| " | 5.0 | " | " |

Samples of the blue ink formulations were coated with K-bar 2.5 onto Rafaltac Raflacoat (RC) and Hi-Fi polyester (PE) substrates. The coated substrates were then used for Nd:YAG (1064 nm) laser text imaging. Two formulations comprised Baytron P, two did not. The results are shown in Table 3.

TABLE 3

| IR Absorber at 5.0% (w/w) | Substrate | Unimaged | Imaged (1064 nm) |
|---|---|---|---|
| — | RC | White | No Image |
| Baytron P | RC | Off-White (grey) | Black Text |
| — | PE | White | No Image |
| Baytron P | PE | Off-White (grey) | BlackText |

The coatings in which Baytron P was absent gave no image or very faint text. PE-based samples gave better results than RC-based ones. Where images were obtained (i.e. when Baytron P was present), they were sharp and well-defined.

Example 26

Solvent-Borne Dispersion Inks

Experiments similar to those of Example 25 were performed except that solvent-based inks were used.

The "standard" formulation was composed of (% w/w):

| | |
|---|---|
| Binder | 18.6 |
| Active Pigment | 22.3 |
| Fluid | 59.1 |

The "active" formulations contained the IR absorber Iriodin LS820 (Merck). The composition of the 5% (w/w) "active" formulation was:

| | |
|---|---|
| Binder | 16.7 |
| Active Pigment | 20.1 |
| Fluid | 53.2 |
| IR Absorber | 10.0 |

The results are shown in Table 4. Again, the presence of an IR absorber allowed image formation to occur.

TABLE 4

| Additive Type | Level % w/w | Unimaged | Imaged (940 nm) |
|---|---|---|---|
| — | n/a | White | No Image |
| — | n/a | " | " |
| — | n/a | " | " |
| Iriodin LS820 | 10.0 | Off-white (slight) | " |
| " | 10.0 | " | " |
| " | 10.0 | " | " |
| " | 10.0 | Off-white (grey/green) | Black Image |
| " | 10.0 | " | " |
| " | 10.0 | " | " |

In the following Examples 27 etc the ink samples prepared follow a generic range where addition of commercially available near-IR absorber has been completed at a suitable level for initial development work. The formulations are based on different ink types (water-borne and solvent-borne) and additive types and levels, therefore the coatings derived from these inks are not standardised.

Examples 27 to 37

Coated samples exposed to near-IR diode laser source. Inks applied by manual drawdown with K-bar 2.5 onto self-adhesive paper. Imaging observed after exposure to near-IR diode laser source Rofin Sinar Dilas DF060 Laser.

TABLE 5

| Example | Additive | Ink Type | Substrate | Diode Lase |
|---|---|---|---|---|
| 27 | 0.1% ProJet 830 NP | Solvent Borne | RC | Dark Image |
| 28 | 0.1% ProJet 900 NP | Solvent Borne | RC | Dark Image |
| 29 | 5.0% Baytron P (in IPA) | Solvent Borne | RC | Dark Image |
| 30 | 10.0% Iriodin LS820 | Solvent Borne | RC | Dark Image |
| 31 | 10.0% Iriodin LS825 | Solvent Borne | RC | Dark Image |
| 32 | 0.1% ProJet 830 NP | Water borne | RC | Dark Image |
| 33 | 0.1% ProJet 900 NP | Water borne | RC | Dark Image |
| 34 | 5.0% Baytron P (Aq.) | Water borne | RC | Dark Image |
| 35 | 5.0% Baytron P (in IPA) | Water borne | RC | Dark Image |
| 36 | 10.0% Iriodin LS820 | Water borne | RC | Dark Image |
| 37 | 10.0% Iriodin LS825 | Water borne | RC | Dark Image |

RC Raflatac Raflacoat self-adhesive paper

Examples 38 to 42

Oxy Metal Anions (Solvent Borne Inks)

Process Outline.
1. Ethanol B and Ethyl Acetate was loaded. Mechanical stirring started at low speed using leading edge trailing blade stirrer.
2. Elvacite 2028 was added over 10 mins into vortex of liquid. Stirred for 30 mins until fully dissolved.
3. Ammonium Octamolybdate was added over 5 mins into vortex of liquid. Stirred for 30 mins until fully dispersed.
4. Aerosil 200 was added over 10 mins into vortex of liquid. Stirred for 15 mins until fully dispersed.
5. Solvent compatible mechanical mill primed with Ethanol B/Ethyl Acetate in the ratio 3:1.
6. Milled for 2 passes. Collected after last pass.
7. Switched off mill.
8. Added IR absorber a) 1 or 2, b) 2 or c) 1 or 2 into liquid. Using addition of various size distribution ceramic balls to effect dispersion the sample and container was placed on the roller mill for several hours until fully dispersed.

a) Phthalocyanine IR Absorbers

Example 38

Addition of ProJet 830NP

| | |
|---|---|
| 43.69% | Ethanol B |
| 14.57% | Ethyl Acetate |
| 18.54% | Elvacite 2028 |
| 22.25% | Ammonium Octamolybdate |
| 0.85% | Aerosil 200 |
| 0.099% | Projet 830 NP |

Example 39

Addition of ProJet 900NP

| | |
|---|---|
| 43.69% | Ethanol B |
| 14.57% | Ethyl Acetate |
| 18.54% | Elvacite 2028 |
| 22.25% | Ammonium Octamolybdate |
| 0.85% | Aerosil 200 |
| 0.099% | Projet 900 NP | b) Conjugated Polymer IR Absorbers

Example 40

Addition of Baytron P (CPP4531E3D)

| | |
|---|---|
| 41.65% | Ethanol B |
| 13.89% | Ethyl Acetate |
| 17.68% | Elvacite 2028 |
| 21.21% | Ammonium Octamolybdate |
| 0.81% | Aerosil 200 |
| 4.76% | Baytron P (CPP4531E3D) | c) Inorganic IR Absorbers

Example 41

Addition of Iriodin LS 820

| | |
|---|---|
| 39.77% | Ethanol B |
| 13.25% | Ethyl Acetate |
| 16.87% | Elvacite 2028 |
| 20.25% | Ammonium Octamolybdate |
| 0.77% | Aerosil 200 |
| 9.09% | Iriodin LS 820 |

Example 42

Addition of Iriodin LS 825

| | |
|---|---|
| 39.77% | Ethanol B |
| 13.25% | Ethyl Acetate |
| 16.87% | Elvacite 2028 |
| 20.25% | Ammonium Octamolybdate |
| 0.77% | Aerosil 200 |
| 9.09% | Iriodin LS 825 |

Examples 43 to 48

Oxy Metal Anions (Water Borne Inks)

Process Outline.
1. Loaded boiling water. Started mechanical stirring at low speed using leading edge trailing blade stirrer.
2. Added Gohsenol GH-17 over 10 mins into vortex of hot liquid. Stirred for 30 mins until fully dissolved.
3. Added Ammonium Octamolybdate into vortex of liquid. Stirred for 30 mins until fully dispersed.
4. Primed water compatible mechanical mill with water. Stirred for 30 mins until fully mixed.
5. Milled for 2 passes. Collected after last pass.
6. Switched off mill.
7. Added Texicryl 13-011 to milled liquid over 5 mins.

8. Added IR absorber a) 1 or 2, b) 1 or 2 or c) 1 or 2 into liquid. Using addition of various size distribution ceramic balls to effect dispersion the sample and container was placed on the roller mill for several hours until fully dispersed.

a) Phthalocyanine IR Absorbers

Example 43

Addition of ProJet 830NP

| | |
|---|---|
| 10.77% | Water |
| 0.77% | Gohsenol GH-17 |
| 26.92% | Ammonium Octamolybdate |
| 61.44% | Scott Bader Texicryl 13-011 |
| 0.099% | Projet 830 NP |

Example 44

Addition of ProJet 900NP

| | |
|---|---|
| 10.77% | Water |
| 0.77% | Gohsenol GH-17 |
| 26.92% | Ammonium Octamolybdate |
| 61.44% | Scott Bader Texicryl 13-011 |
| 0.099% | Projet 900 NP | b) Conjugated Polymer IR Absorbers

Example 45

Addition of Baytron P

| | |
|---|---|
| 10.27% | Water |
| 0.73% | Gohsenol GH-17 |
| 25.67% | Ammonium Octamolybdate |
| 58.56% | Scott Bader Texicryl 13-011 |
| 4.76% | Baytron P |

Example 46

Addition of Baytron P (CPP4531E3D)

| | |
|---|---|
| 10.27% | Water |
| 0.73% | Gohsenol GH-17 |
| 25.67% | Ammonium Octamolybdate |
| 58.56% | Scott Bader Texicryl 13-011 |
| 4.76% | Baytron P (CPP4531E3D) | c) Inorganic IR Absorbers)

Example 47

Addition of Iriodin LS820

| | |
|---|---|
| 9.80% | Water |
| 0.70% | Gohsenol GH-17 |
| 24.50% | Ammonium Octamolybdate |
| 55.91% | Scott Bader Texicryl 13-011 |
| 9.09% | Iriodin LS820 |

Example 48

Addition of Iriodin LS825

| | |
|---|---|
| 9.80% | Water |
| 0.70% | Gohsenol GH-17 |
| 24.50% | Ammonium Octamolybdate |
| 55.91% | Scott Bader Texicryl 13-011 |
| 9.09% | Iriodin LS825 |

Coatings

Examples 38 to 48 were coated onto self-adhesive paper substrate with K-bar 2.5 drawdown application. 1 and 2 hits were applied to generate sufficient coat weight.

Samples were sectioned to provide representative portions for imaging evaluation.

Imaging

Coated samples of Examples 38 to 48 were exposed to the Rofin Sinar Dilas DF060 Laser, a diode laser source at near-IR wavelengths. At an appropriate setting, power at between 1 and 4 Watts and dwell time at 70 milliseconds, an image was observed.

We claim:

1. A method for providing an image on a substrate, which comprises applying to the substrate a composition that comprises a binder, a compound including an oxyanion of a multivalent metal, wherein the compound and the binder in combination are such that the compound can undergo a color change due to a change in oxidation state on irradiation at a wavelength of 10,600 nm, and an IR absorber that absorbs laser radiation; and wherein said method further comprises subjecting the composition to near-IR irradiation at a wavelength of 800-1500 nm, whereby the irradiation is insufficient to cause the color change in the absence of the IR absorber but such color change occurs in the presence of the IR absorber.

2. The method, according to claim 1, wherein the irradiation is by means of a laser.

3. The method, according to claim 1, wherein the binder comprises a labile group.

4. The method, according to claim 1, wherein the binder is a polymer.

5. The method, according to claim 1, wherein the oxyanion is octamolybdate.

6. The method, according to claim 1, wherein the composition additionally comprises a colour-former.

7. The method, according to claim 1, wherein the composition comprises a substantially colourless electron-donating dye precursor.

8. The method, according to claim 1, wherein the composition comprises a conductive polymer.

9. The method, according to claim 1, wherein the irradiation is by means of a laser at a wavelength of about 1064 nm.

10. The method, according to claim 9, wherein the IR absorber that absorbs laser radiation is a conductive polymer.

11. The method, according to claim 1 wherein the IR absorber that absorbs laser radiation is a conductive polymer.

* * * * *